Oct. 4, 1949.  A. F. SONN  2,483,985
SQUEEZER FOR TEA BAGS
Filed Sept. 2, 1947

Inventor
Albert F. Sonn
By Thomas A. Jenckes
Attorney

Patented Oct. 4, 1949

2,483,985

UNITED STATES PATENT OFFICE 2,483,985

SQUEEZER FOR TEA BAGS

Albert F. Sonn, Cranston, R. I.

Application September 2, 1947, Serial No. 771,804

2 Claims. (Cl. 100—41)

My invention relates to improvements in squeezers for tea bags.

During recent years, sellers of tea have tended to ship tea in tea bags, each of a size to make a cup of tea. In using these tea bags, the user merely puts a tea bag in the cup, pours hot water over it and leaves it. After said cup is brewed, the tea bag then is supposed to be thrown away. I have found, however, that by squeezing the tea bag, all the tea is not extracted therefrom and that successive cups of tea may be made from the same tea bag, preferably in the same cup, by squeezing it in a manner not to break the frangible tea bag. These tea bags are usually made out of cheap grades of fabric, either cheap cotton fabric or cheap paper fabric, which is readily frangible and if squeezed throughout their area such as by various types of sugar tongs or fruit squeezers, they tend to break in use. I have discovered, however, that if the body of the squeezer be made of a skeleton shape with oblong rims of substantially the area of the top and bottom surfaces of the flat tea bag and having spaced transverse griddle bars, that the griddle bars may gently squeeze the tea bag at spaced distances thereof without rupture thereof and my invention comprises the application of this principle to a tea bag squeezer. I have found that in place of one cup of tea being extractable from a tea bag, three and often four cups of tea are so extractable by the repeated application of my improved tea bag squeezer.

A further object of my invention is to provide a tea bag squeezer which is simple and economical to make and which is easy to operate.

A further object of my invention is to provide a tea bag squeezer which after most of the tea has been extracted therefrom may then extract most of the liquid therefrom so that it may be readily removed from the tea cup without dripping.

These and such other objects of my invention as may hereinafter appear will be best understood from a description of an embodiment thereof such as is shown in the accompanying drawings.

Figure 1:
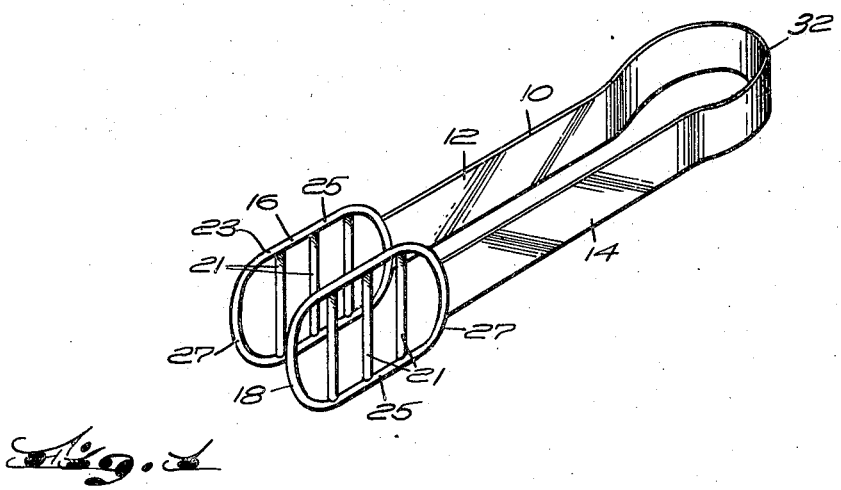

In the drawings, Fig. 1 is a perspective view of a tea bag squeezer constructed in accordance with my invention.

Figure 2:
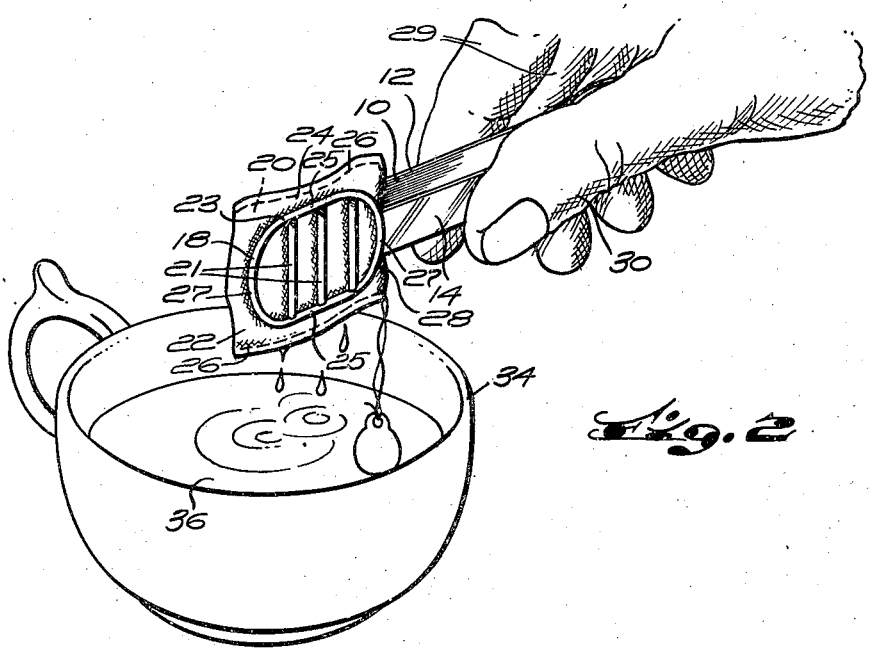

Fig. 2 is a perspective view of my improved tea bag squeezer in use over a cup of tea, showing how the tea bag may be squeezed by my invention to extract an optimum amount of tea extract from the tea bag.

In the drawings, wherein like characters of reference generally indicate like parts throughout, 10 generally indicates a squeezer for tea bags and the like constructed in accordance with my invention. Said invention includes a pair of readily compressed arms 12 and 14 terminating griddles 16 anad 18 respectively of substantially the area of the flat surfaces 20 and 22 of a flat tea bag 24. As stated, tea now is largely sold in tea bags constructed of fabric folded over on itself and having the upper and lower surfaces 20 and 22 joined together by the lines of stitching 26 forming the seams along each side thereof and an additional line of stitching 28 at the open end thereof. The tea leaves are inserted within the tea bag and the flat tea bags so packed with tea are sold in a package. An individual tea bag is adapted to make one cup of tea, but I have found that if the tea bag is squeezed, it is possible to make either a stronger tea concoction or much more than one cup of tea. Said tea bags are constructed of a very cheap frangible fabric such as cheap cotton cloth or a cheap paper which is very apt to be frangible and break or rupture if squeezed when wet and for this reason I have so designed my improved tea bag squeezer that it will not rupture such a frangible tea bag in use. To this end, I provide each of my improved griddles 16 and 18 with the transverse griddle bars 21. In general, the griddles 16 and 18 are made of equal size and shape and are provided with the oblong rims 23, having the straight sides 25 and preferably circularly curved ends 27. The griddle bars 21 join said sides 25 at longitudinally spaced distances thereof, in the embodiment shown there being three griddle bars in each griddle. As shown in Fig. 2, it is apparent in use that when said griddle bars are compressed against each opposite wall of the tea bag, the griddle bars will gently squeeze the tea bag at spaced distances thereof without causing rupture thereof, the tea bag bulging outwardly between the griddle bars as shown diagrammatically in Fig. 2.

I also preferably provide spring means normally operative to separate said griddles 16 and 18 when the compressing pressure exerted by the fingers 29 on the arm 12 and the thumb 30 on the opposite arm 14 is released. It is obvious that if this releasing pressure is not desired, the arms may be pivoted or otherwise joined together in any suitable manner so as to be brought into compressing relationship to each other against the walls of the tea bag. In the preferred embodiment shown, I have constructed my improved squeezer in the form of tongs with the flat arms 12 and 14 respectively joined together by the spring arcuate bow 32, which is actually an arcuate continuation of the resilient flat stock of which said arms 12 and 14 are made. It is apparent, therefore, that this spring bow 32 yields to permit compression of the arms 12 and 14 to permit the griddles 16 and 18 thereof to squeeze the opposite side walls of the tea bag 20, but when the compression exerted by the fingers 29 on the arm 12 against the thumb 30 on the arm 14 is released that the spring bow 32 will function to separate said arms 12 and 14 to permit the tea bag to drop therefrom. The tea bag may be dropped into the tea cup 34 as usual containing the hot water 36 or other liquid and allowed to remain there the desirable amount of time to brew the tea of the desired strength.

If desired to brew the tea more quickly, the tea bag may be picked up by the squeezer by inserting the griddles under the surface of the hot water, picking up the tea bag and squeezing it in the manner shown and the tea bag may temporarily be left in the saucer while the initial cup of tea is drunk. Then when the tea cup 34 is again filled with hot water, the tea bag may again be inserted in the tea cup and squeezed in the manner shown through several additions of hot water to make additional cups of tea out of the same tea bag. It is obvious that when pressure is released by the fingers 29 and thumb 30 that the griddles 16 and 18 will spring open and the partially spent tea bag 20 again dropped in the tea cup 34, or, if exhausted, into any waste receptacle.

It is apparent that I have provided a novel type of squeezer for tea bags and the like with the advantages explained above.

It is understood that my invention is not limited to the specific embodiment shown and that various deviations may be made therefrom without departing from the spirit and scope of the appended claims.

What I claim is:

1. A squeezer for tea bags comprising spring tongs having flat arms, each arm having at one end thereof a griddle of oblong shape having a greater width than the width of the arms and including bars spaced from the ends and from each other, the opposite ends of the griddle and the adjacent spaced bars defining substantially semi-circular openings.

2. A squeezer for tea bags, comprising spring tongs having flat arms, each arm having at one end thereof a griddle of oblong shape, having a greater width than the width of the arms and including bars spaced from each other, the ends of said griddles having substantially semi-circular edges.

ALBERT F. SONN.

REFERENCES CITED

The following references are of record in the file of this patent:

UNITED STATES PATENTS

| Number | Name | Date |
| --- | --- | --- |
| 1,305,806 | Keppeler | June 3, 1919 |
| 1,353,056 | Ludwig | Sept. 14, 1920 |

FOREIGN PATENTS

| Number | Country | Date |
| --- | --- | --- |
| 44,343 | Switzerland | Feb. 2, 1909 |